United States Patent

Shiga et al.

[11] Patent Number: 5,909,985
[45] Date of Patent: Jun. 8, 1999

[54] DRILL HAVING PLATE-LIKE CUTTER MEMBER FIXED AT PROXIMAL END TO SHANK AND HAVING CUTTING EDGE AT DISTAL PORTION

[75] Inventors: Kiyotaka Shiga, Okazaki; Akio Fukui, Toyohashi; Kazuaki Terada, Toyota; Takahiro Yamada, Anjo; Haruyasu Toyoda; Masashi Miyake, both of Toyota; Akihiro Umeda, Chiryu, all of Japan

[73] Assignee: Fuji Seiko Limited, Toyota, Japan

[21] Appl. No.: 08/841,809

[22] Filed: May 5, 1997

[30] Foreign Application Priority Data

May 8, 1996 [JP] Japan ..................................... 8-113305

[51] Int. Cl.$^6$ .......................... B23B 35/00; B23B 51/06; B23P 15/32
[52] U.S. Cl. .......................... 408/1 R; 76/108.1; 408/57; 408/144; 408/231; 408/233; 408/713
[58] Field of Search ................................ 408/57, 59, 144, 408/227, 229, 231, 233, 713, 1 R; 76/108.1, 108.6

[56] References Cited

U.S. PATENT DOCUMENTS

| 1,017,352 | 2/1912 | Wagner | 408/233 |
| 2,689,131 | 9/1954 | Priest | 408/211 |
| 2,794,468 | 6/1957 | Huxtable | 408/227 |
| 2,817,983 | 12/1957 | Mossberg | 408/59 |
| 2,971,409 | 2/1961 | Peters et al. | 408/59 |
| 3,333,489 | 8/1967 | Mossberg | 408/233 |

*Primary Examiner*—Steven C. Bishop
*Attorney, Agent, or Firm*—Oliff & Berridge, PLC

[57] ABSTRACT

A drill including a cutter member and a shank which are formed separately from each other and fixed to each other for rotation as a unit, wherein the shank has an engaging groove formed in a distal end face thereof such that the engaging groove extends in an axial direction of the shank and is aligned with a center of the distal end face, and the cutter member consists of a rectangular plate including a proximal end portion fixed to the shank by engagement thereof with the engaging groove, and a distal end portion which is remote from the shank and which has at least one cutting edge.

23 Claims, 6 Drawing Sheets

DRILL HAVING PLATE-LIKE CUTTER MEMBER FIXED AT PROXIMAL END TO SHANK AND HAVING CUTTING EDGE AT DISTAL PORTION

CROSS REFERENCE TO RELATED APPLICATIONS

This application is based on Japanese Patent Application No. 8-113305 filed May 8, 1996, the content of which is incorporated hereinto by reference.

BACKGROUND OF THE INVENTION

1. Field of the Invention

The present invention relates to a drill having a shank and a cutter member which are formed separately from each other and are fixed to each other.

2. Discussion of the Related Art

There are two types of drills. In the first type, a cutting portion having cutting edges is formed integrally with a shank portion. In the second type, a cutter member and a shank member which are formed separately from each other are fixed to each other.

SUMMARY OF THE INVENTION

It is an object of the present invention to provide a drill of the second type described above, which is simple in construction and which is economical to manufacture.

The above object may be achieved according to the principle of the present invention, which provides a drill including a cutter member and a shank which are formed separately from each other and fixed to each other for rotation as a unit, wherein the shank has an engaging groove formed in a distal end face thereof such that the engaging groove extends in an axial direction of the shank and is aligned with a center of the distal end face, and the cutter member comprises a rectangular plate including a proximal end portion fixed to the shank by engagement thereof with the engaging groove, and a distal end portion which is remote from the shank and which has at least one cutting edge.

The rectangular plate of the cutter member may be entirely formed of a material suitable to provide the cutting edge or edges. Alternatively, only a part of the distal end portion on which the cutting edge or edges is/are formed is formed of a material which has a higher hardness than a material of the other portion of the plate and which is according suitable for forming cutting edge or edges. In the former case, the distal end portion of the cutter member is formed with flanks, and the cutting edges are formed along lines of intersection between the flanks and opposite major side surfaces of the rectangular plate which serve as cutting faces. In the latter case, a mass of a material having a sufficiently high hardness is bonded to an appropriate portion of the plate, and this mass is formed to produce flanks and cutting faces so that the cutting edges are formed along lines of intersection of these flanks and cutting faces.

In either of the above two cases, the opposite major side surfaces of the rectangular plate may cooperate with an inner circumferential surface of a hole or bore being drilled by the present drill, to provide chip removal channels or passages extending in the axial direction of the drill, which passages function as flutes provided in the known drill for removing cutting chips. In other words, the manufacture of the present drill does not require a step of forming such flutes, resulting in significant reduction in the cost of manufacture of the present drill. Further, the engagement of the proximal end portion of the cutter member with the engaging groove formed in the distal end face of the shank facilitates firm fixing of the cutter member to the shank.

In a first preferred form of the present invention, the cutter member and the shank are made of different materials. For example, the cutter member is made of a cemented or sintered carbide, a ceramic material or a cermet, while the shank is made of a special steel or a tool steel. Although the material of the cutter member should have a hardness value high enough to withstand a cutting resistance, the material of the shank is required to have strength and rigidity values high enough to support the cutter member. Thus, the use of two different materials for the cutter member and the shank makes as described above permits the cutter member and the shank to satisfy the respective different properties required, and makes it possible to manufacture the drill at a lower cost than in the case where the drill is entirely made of a single material.

In a second preferred form of the invention, the shank has a cylindrical distal end portion which has the distal end face, and the engaging groove takes the form of a slot which is formed through the cylindrical distal end portion in a diametric direction of the distal end portion. Since the slot extends through the cylindrical distal end portion in the diametrical direction, the slot can be comparatively easily formed. Where the engaging groove is not formed diametrically through the distal end portion, this groove should be formed by a special machining process such as an electrical discharge machining process. Where the engaging groove is a slot formed diametrically through the distal end portion, the slot can be easily formed by a screw slotting cutter, for example.

In a third preferred form of the invention, the proximal end portion of the cutter member is brazed to the shank. The brazing permits easy fixing of the proximal end portion of the cutter member to the shank with a bonding strength sufficient to prevent removal of the cutter member from the shank due to heat generated during use of the drill. Where the drill has a hole for delivering a coolant, the cutter member may be fixed to the shank by soldering or an adhesive agent, since the temperature rise of the cutter member and the shank due to the heat generated during a drilling operation can be effectively reduced by a heat transfer effect of the coolant.

In one advantageous arrangement of the above third preferred form of the invention, surfaces which define the engaging groove include a non-contact portion which is not in contact with the distal end portion of the cutter member. Where the cutter member and the shank which are made of different materials as described above with respect to the first preferred form of the invention, the brazing of the cutter member to the shank may cause cracking or other damage of the cutter member due to a difference between coefficients of linear expansion of the cutter member and shank. In this case, however, the provision of the non-contact portion of the surfaces defining the engaging groove reduces the surface area of contact between the cutter member and the shank, and is therefore effective to avoid the damage of the cutter member.

For example, the non-contact portion indicated above may be easily provided by an axial hole which is formed in the cylindrical distal end portion of the shank, so as to extend in the axial direction of the shank. In this case, the axial hole has a diameter larger than a width of the engaging groove as measured in a direction perpendicular to the diametric direction of the cylindrical distal end portion.

In a fourth preferred form of this invention, the proximal end portion of the shank is removably fixed to the shank, by using a screw or screws and/or a pin or pins. In this case, the cutter member which is no long useable due to excessive wear can be removed, and a new cutter member may be removably fixed to the same shank.

In a fifth preferred form of the invention, the shank has a coolant hole formed therethrough in the axial direction. In this instance, the coolant hole has a distal end portion which is open in the distal end face and whose axial length is larger than a depth of the engaging groove in the axial direction of the shank, and the distal end portion has a diameter larger than a width of the engaging groove. The coolant hole is connected to a suitable coolant supply device, so that a coolant is delivered to an area of drilling of the workpiece and the cutting edges of the cutter member, through clearances between the side surfaces of the cutter member and the inner circumferential surface of the coolant hole.

The coolant hole may have the same diameter over the entire axial length thereof, or have different diameters. The coolant hole having the same diameter is generally easy to form. In some cases, however, it is desirable that the portion of the coolant hole corresponding to the depth of the engaging groove in the axial direction of the shank have a comparatively small diameter, while the other portion of the coolant hole have a comparatively large diameter. Where the shank has a relatively small diameter, the coolant hole has an accordingly small diameter and cannot be easily formed over the entire axial length of the shank. In this sense, the diameter of the coolant hole is desirably large. However, an increase in the diameter at the distal end portion of the shank results in a decrease in the strength of the distal end portion, which has the coolant hole as well as the engaging groove. For easily forming the coolant hole while minimizing the strength reduction at the distal end portion due to the coolant hole, it is desirable that the diameter of the distal end portion of the coolant hole be comparatively small, while the diameter of the other portion of the coolant hole be comparatively large.

In the other cases, it is desirable that the distal end portion of the coolant hole corresponding to the depth of the engaging groove have a comparatively large diameter, while the other portion of the coolant hole have a comparatively small diameter. If the diameter of the distal end portion of the coolant hole is larger than the thickness of the proximal end portion of the cutter member, namely, larger than the width of the engaging groove, clearances between the side surfaces of the proximal end portion of the cutter member and the inner circumferential surface of the distal end portion of the coolant hole may be used as coolant delivery ports. In this case, however, the diameter of the other portion of the coolant hole is desirably small for assuring sufficient overall rigidity of the shank. Where the cutter member is brazed to the shank, the distal end portion of the coolant hole functions as the axial hole which provides the non-contact portion of the engaging groove indicated above.

In one advantageous arrangement of the above fifth preferred form of the invention, the ratio of the diameter of the distal end portion of the coolant hole to a diameter of the shank is within a range of 0.2–0.6. The diameter of the distal end portion of the coolant hole which corresponds to the axial depth of the engaging groove should be larger than the width of the engaging groove (thickness of the cutter member, i.e., thickness of the rectangular plate). Therefore, the ratio of the diameter of this distal end portion of the coolant hole to the diameter of the shank should be determined depending upon the ratio of the width of the engaging groove to the diameter of the shank. The ratio of the diameter of the distal end portion of the coolant hole to the diameter of the shank is preferably held within a range of 0.2–0.5, and more preferably within a range of 0.3–0.4.

In a sixth preferred form of this invention, the plate of the cutter member has a width not larger than a diameter of the shank, and an axial length which is at least two times the width. Where the width of the cutter member is not larger than the diameter of the shank, the maximum depth of a hole to be drilled by the cutter member is determined by the length of a distal end portion of the cutter member which extends from the distal end face of the shank, because cutting chips cannot be removed from the drilled hole after the drilled hole is closed by the distal end of the shank. Generally, the length of the portion of the cutter member extending from the distal end face of the shank increases with an increase in the total axial length of the cutter member. That is, the maximum depth of a hole to be drilled by the drill increases with an increase in the total axial length of the cutter member. In this respect, it is particularly desirable that the total axial length of the cutter is at least three times the width of the cutter member.

In a seventh preferred form of this invention, the proximal end portion includes an engaging part having an axial length equal to an axial depth of the engaging groove so as to be fitted in the engaging groove, the ratio of the axial length of the engaging part, to a total axial length of the cutter member is within a range of 0.1–0.5. Where the cutting resistance applied to the cutter member is not so large, the length of the engaging part of the cutter member need not be so large. In other words, the required length of the engaging part of the cutter member increases with an increase in the cutting resistance. Generally, the ratio of the axial length of the portion to the total axial length of the cutter member is preferably within a range of 0.1–0.4, and more preferably within a range of 0.2–0.3.

BRIEF DESCRIPTION OF THE DRAWINGS

The above and other objects, features, advantages and technical and industrial significance will be better understood by reading the following detailed description of presently preferred embodiments of the invention, when considered in connection with the accompanying drawings, in which.

DETAILED DESCRIPTION OF THE PREFERRED EMBODIMENTS

Figure 1:
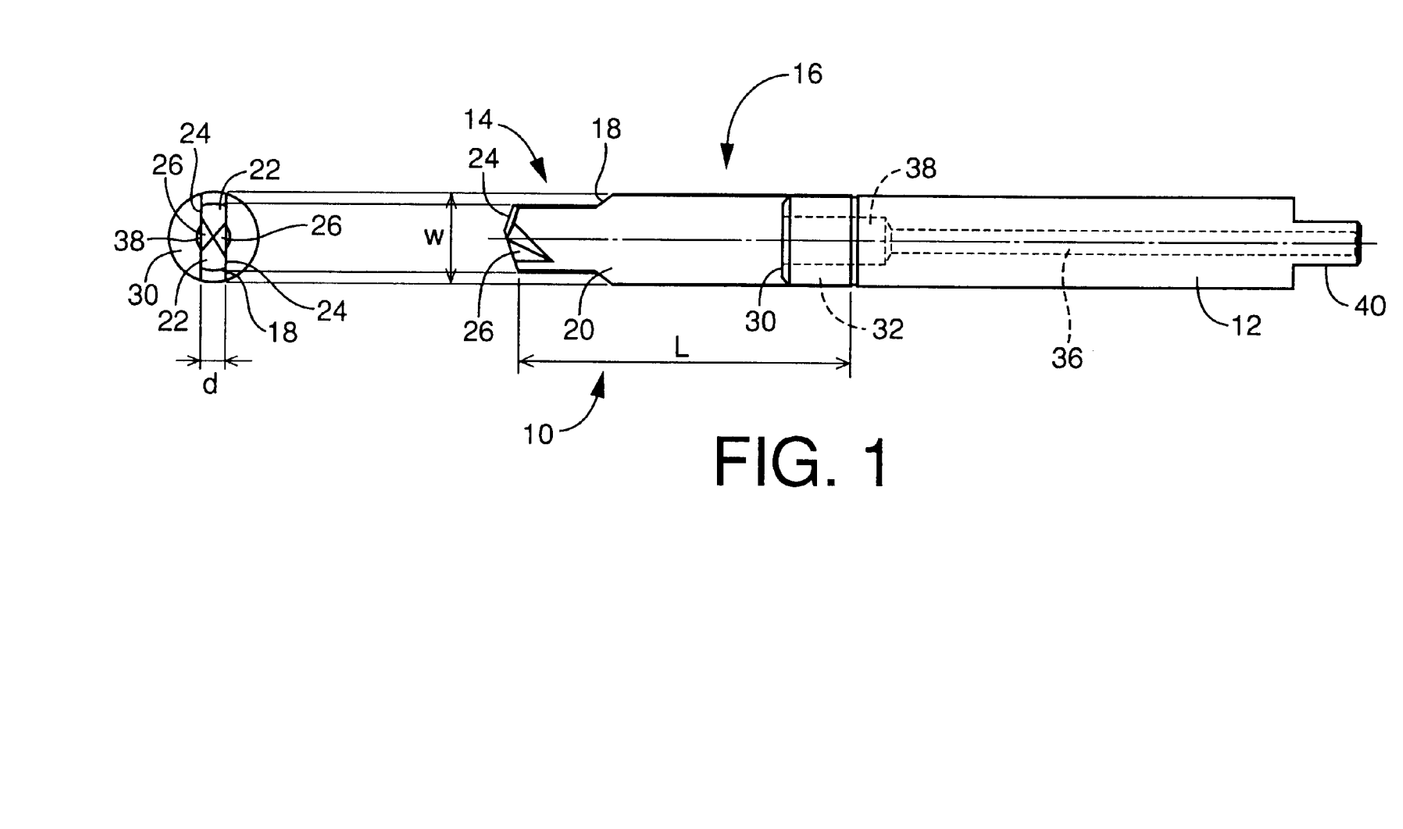
FIG. 1 is a front and a side elevational view of a drill according to one embodiment of this invention.
Figure 2:
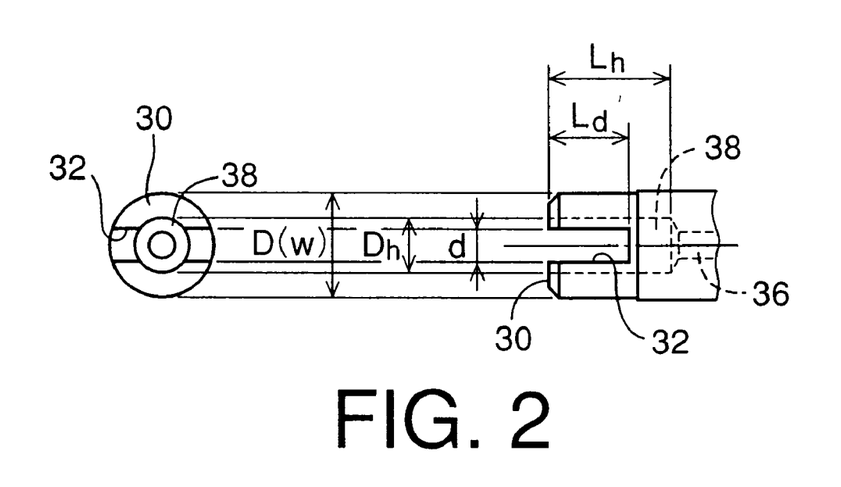
FIG. 2 is a front and a side elevational view of a distal end portion of a shank of the drill of FIG. 1.

Referring first to FIGS. 1 and 2, a drill according to the first embodiment of this invention consists of a cutter member 10 and a shank 12 which are formed or manufactured separately from each other and are fixed together for rotation as a unit. The cutter member 10 is made of a cemented carbide, while the shank 12 is made of a special steel.

The cutter member 10 is manufactured by forming cutting edges in the distal end portion of a rectangular plate made of a cemented carbide. The plate has a thickness d equal to the margin width of the cutter member 10, a width w equal to a diameter D of the shank 12, and a length L which is two to seven times the width w. The cutter member 10 has a distal end portion 14 whose width is smaller than the width w of the plate as a result of cutting the distal end portion of the plate to form the cutting edges. Between the distal end portion 14 and the other portion of the cutter member 10 (rectangular plate), there is formed a countersinking or chamfering edge 18. The width of the distal end portion 14 is substantially equal to a diameter of a hole to be formed in the workpiece by the drill. The axial length of the distal end portion 14 is slightly smaller than a depth of the hole to be drilled. Where a hole or bore is drilled through the workpiece, however, the length of the distal end portion 14 is larger than the depth of the hole to be drilled.

The cutter member 10 in the form of the rectangular plate has opposite major surfaces 20, which cooperate with the inner circumferential surface of a hole or bore being drilled by the present drill, to provide chip removal channels or passages extending in the axial direction of the drill. Since these passages function as flutes provided in the known drill for removing cutting chips, the manufacture of the present drill does not require a step of forming such flutes, resulting in significant reduction in the cost of manufacture of the present drill.

At the tip of the distal end portion 14, there are formed two flanks 22 which are inclined so as to approach the shank 12 as they extend from the axis of the drill in the radially outward direction and as they rotate in the direction opposite to the direction of rotation of the drill. The cutting edges, which are indicated at 24 in FIG. 1, are formed along lines of intersection between the flanks 22 and the major surfaces 20. Thinnings 26 are provided to reduce a chisel edge at a line of intersection between the two flanks 22. In the present embodiment, the chisel edge is removed by cross thinning.

The shank 12 takes the form of a round rod having a substantially circular shape in transverse cross section. The shank 12 has a distal end face 30 in which an engaging groove in the form of a slot 32 is formed such that the slot 32 has a depth in the axial direction of the shank 12 and is aligned with the center of the distal end face 30, as shown in FIG. 2. Described in detail, the slot 32 is formed through the distal end portion of the cylindrical shank 12 in a diametrical direction, so that the center of the circular distal end face 30 lies in the formed slot 32. The slot 32 has a width equal to the thickness d of the cutter member 10 (more precisely, slightly larger than the thickness d), and a depth Ld which is about one fifth of the length L of the cutter member 10. The cutter member 10 has a proximal end portion 16 which is partially fixedly fitted in the slot 32. The depth Ld of this slot 32 is equal to an axial length of engagement between the proximal end portion 16 and the shank 12. The ratio Ld/L, that is, the ratio of the depth or engagement length Ld to the length L of the cutter member 10 is about ⅕=0.2.

The shank 12 has a coolant hole 36 formed therethrough in the axial direction. The coolant hole 36 has two portions having different diameters, which includes a distal end portion in the form of a large-diameter portion 38 which is open in the distal end face 30 and whose axial length Lh is larger than the depth Ld of the slot 32 (Lh>Ld). The large-diameter portion 38 has a diameter Dh larger than a diameter of the other portion. As shown in FIG. 2, the diameter Dh of the large-diameter portion 38 is larger than the width of the slot 32, that is, larger than the thickness d of the cutter member 10 (Dh>d), whereby the coolant hole 36 is communicates with the slot 32, more precisely, is open in the bottom and side surfaces of the slot 32. In the present embodiment, the ratio Dh/D, namely, the ratio of the diameter Dh of the large-diameter portion 38 to the diameter D of the shank 12 is about 0.5. The shank 12 has a tang 40 formed at its proximal end portion. The tang 40 functions to transmit a torque from a suitable tool holder to the drill. The tang 40 is a planar portion whose thickness is larger than the diameter of the coolant hole 36, as shown in FIG. 1. The shank 12 may be formed from a round rod which is commercially available at a relatively low cost.

The cutter member 10 is brazed at its proximal end portion 16 to the inner surfaces of the slot 32. After the cutter member 10 is thus fixed to the shank 12, the drill is subjected to a cylindrical grinding operation at the end faces of the cutter member 10 which are opposed to each other in the direction of width w, and at the outer circumferential surface of the distal end portion of the shank 12, the axial length of which is slightly larger than the depth Ld of the slot 32. Thus, the drill is economically finished by a simple grinding operation. With the proximal end portion 16 of the cutter member 10 being fixedly fitted in the slot 32 of the shank 12, there are left clearances or gaps between the side surfaces 20 of the cutter member 10 and the inner circumferential surface of the large-diameter portion 38, which functions as an axial hole formed to provide a non-contact portion of the slot 32 with the proximal end portion 16. The clearances function as coolant delivery ports through which a coolant supplied through the coolant hole 36 is delivered to the distal end portion 14 of the cutter member 10 and the workpiece.

Figure 10:
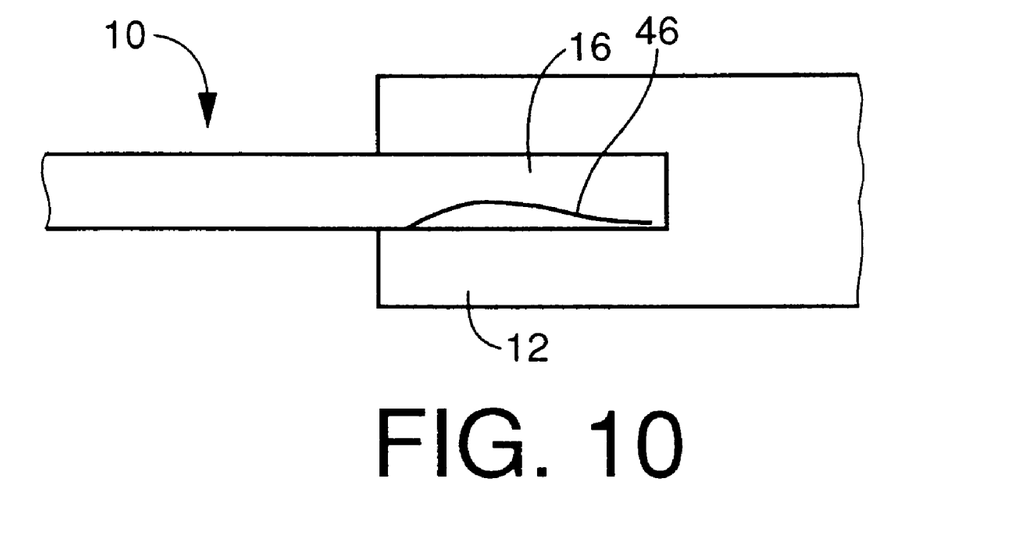
FIG. 10 is a view showing a crack produced on the cutter member due to a difference in coefficient of linear expansion between the cutter member and the shank.

As described above, the diameter Dh of the large-diameter portion 38 of the coolant hole 36 is larger than the width d of the slot 32, and the length Lh of the large-diameter portion 38 is larger than the depth Ld of the slot 32. In this arrangement, the end face and the side surfaces of the proximal end portion 16 brazed in the slot 32 are not entirely held in contact with the inner surfaces of the slot 32. That is, an intermediate part of the proximal end portion 16 as viewed in the direction of width w of the cutter member 10 is not in contact with and not brazed to the surfaces of the slot 32. In other words, the surfaces defining the slot 32 and the large-diameter portion 38 as the axial hole include a non-contact portion which is not in contact with the proximal end portion 16 of the cutter member 10. Since the cutter member 10 and the shank 12 are made of different materials as explained above, the proximal end portion 16 of the cutter member 10 (made of a relatively hard brittle material) may suffer from a crack 46 as indicated in FIG. 10, due to a difference between the coefficients of linear expansion of the cutter member 10 and the shank 12, when the proximal end portion 16 and the corresponding distal end portion of the shank 10 are heated during brazing of the cutter member 10 to the shank 12. The provision of the above-indicated non-contact portion provided by the axial hole 38 is effective to permit the shank 12 to undergo elastic deformation due to the above-indicated difference of the linear expansion coefficients, thereby protecting the proximal end portion 16 against cracking during brazing thereof to the shank 10.

There will be described a drilling operation to be performed by the drill.

The present drill is attached at its shank 12 to a main spindle of a machine tool such as a drilling machine, such that the shank 12 is held by a suitable tool holder removably attached to the main spindle. The coolant hole 36 is connected to a coolant passage which is formed through the tool holder and which is connected to a suitable coolant supply device. The drill is rotated by the main spindle and is fed toward the workpiece, whereby a hole is drilled in the workpiece by the drill. During this drilling operation, the coolant is delivered from the coolant hole 36 to a point of contact between the cutter member 10 and the workpiece, namely, to a portion of the workpiece cut by the cutting edges 24, through spaces defined by the side surfaces 20 of the cutter member 10 and the inner circumferential surface of the hole being drilled. Cutting chips produced during the drilling operation are moved through the above-indicated spaces, in the direction opposite to the direction of flow of the coolant, whereby the cutting chips are removed out of the drilled hole. Thus, the coolant may be delivered to the point of contact of the cutter member 10 and the workpiece, without a coolant hole formed through the cutter member 10, and the cutting chips may be removed without chip removal grooves or flutes formed in the cutter member 10.

Figure 3:
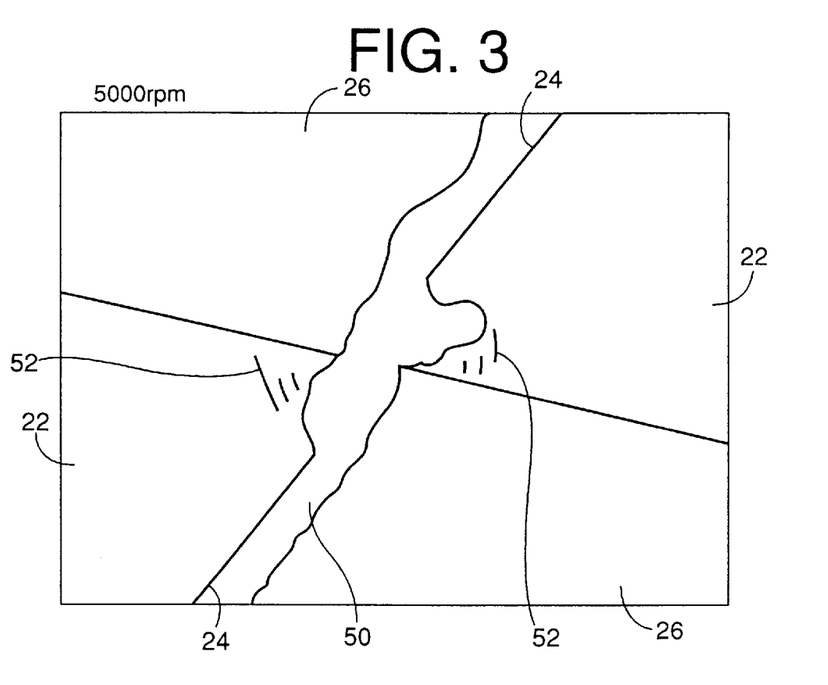
FIG. 3 is a view indicating a result of inspection of a tip of the drill of FIG. 1 by a tool makers' microscope, after the drill is used for drilling.
Figure 4:
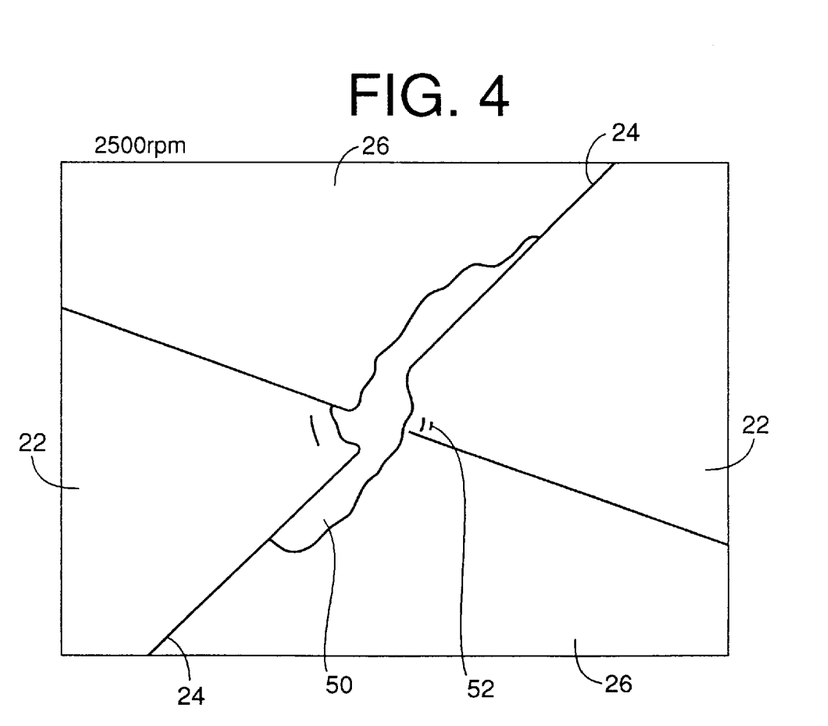
FIG. 4 is a view indicating a result of inspection of the tip of the drill of FIG. 1 by a tool makers' microscope, after the drill is used in a drilling condition different from that of FIG. 3.

FIGS. 3 and 4 show results of inspection by a tool makers' microscope of the tip of the cutter member 10 of the present drill after the drill was used to form 81 holes in the workpieces in a test drilling operation. FIG. 3 shows the result where the present drill was rotated at 5000 r.p.m. and fed at a rate of 150 mm/min., while FIG. 4 shows the result where the drill was rotated at 2500 r.p.m. and fed at a rate of 75.4 mm/min. It will be understood from FIGS. 3 and 4 that built-up edges 50 were formed near the cutting edges 24 irrespective of the difference in the drilling conditions, and that the amount of the built-up edge 50 was larger in the case where the drill was rotated at 5000 r.p.m. It was also found that while some scores 52 were left on the tip of the drill, the score 52 was more serious in the case of the drilling operation at 5000 r.p.m. The degree of the score 52 indicates the degree of wear of the drill. The score or wear of the drill did not have an adverse influence on the drilling operation.

A test was also conducted to check the drilled holes for the accuracy of their diameters and smoothness of the surfaces. The test revealed that the surface smoothness of the holes drilled by the present drill was slightly worse than in the case of a conventional drilling operation using a conventional ordinary drill, but the accuracy of the diameters of the holes drilled by the present drill was almost the same as in the conventional drilling operation.

The above tests show that the present drill is capable of drilling holes with a satisfactory level of accuracy.

While the cutter member 10 is formed from a rectangular plate of a cemented carbide, the cutter member 10 may be formed of a ceramic material or a cermet, or alternatively a tool steel subjected to a surface treatment. Further, cutting edges may be formed on the distal end portion 14 of a plate, by bonding a suitable material such as borazon to the distal end portion 14.

The proximal end portion 16 of the cutter member 10 may be provided with a central protrusion formed in a central portion of the proximal end face. In this case, the central protrusion is held in engagement with the end portion of the large-diameter portion 38 of the coolant hole 36. Alternatively, the slot 32 may be replaced by an engaging groove or recess which is formed, by electrical discharge machining, for example, in a central portion of the distal end face 30 of the shank 12. This engaging groove does not extend through the distal end portion of the shank 12 in the diametrical direction. The engaging groove is held in engagement with a corresponding portion of the proximal end portion 16 of the cutter member 10 or an appropriate central protrusion formed on the proximal end face of the cutter member 10. In these cases, the axis of the cutter member 10 and the axis of the shank 10 can be accurately aligned with each other, and the grinding of the end faces of the cutter member 10 which are opposed to the direction of width w is not essential to assure the alignment of the cutter member 10 and the shank 12.

The coolant hole 36 may have a constant diameter over the entire axial length. Further, the coolant hole 36 may be eliminated.

While the cutter member 10 is brazed to the shank 12 in the first embodiment, the cutter member 10 may be removably fixed to the shank 12 by using at least one screw and/or at least one pin.

Figure 5:
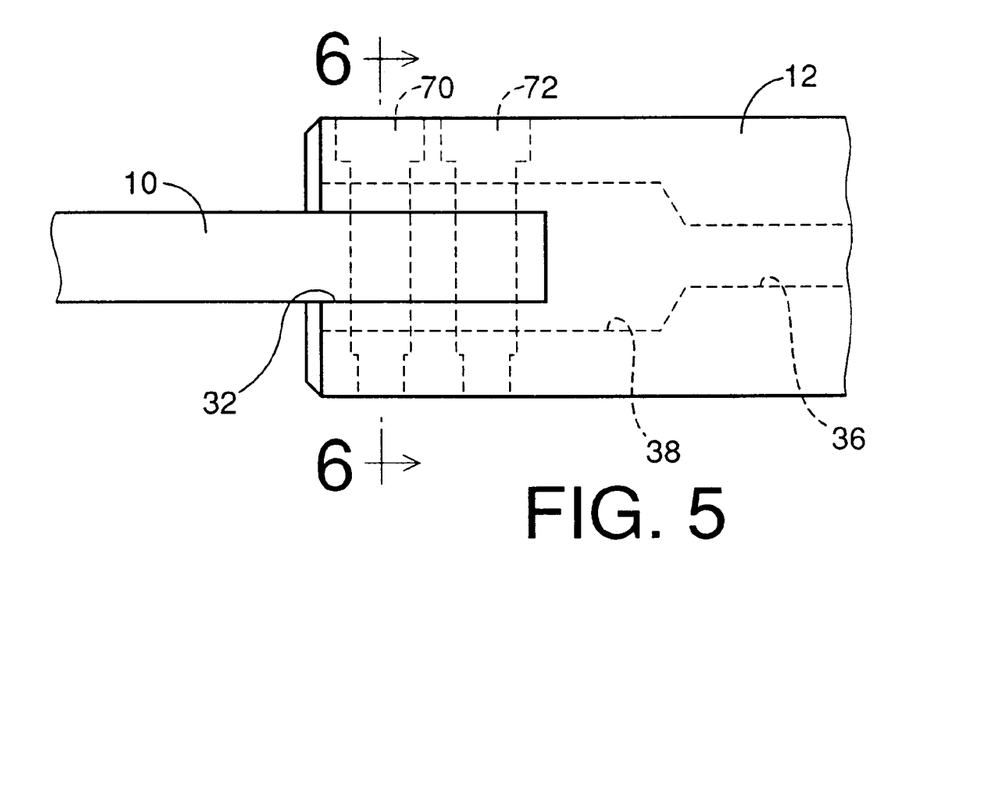
FIG. 5 is a side elevational view showing a proximal end portion of a cutter member and a distal end portion of a shank of a drill according to another embodiment of the invention.
Figure 6:
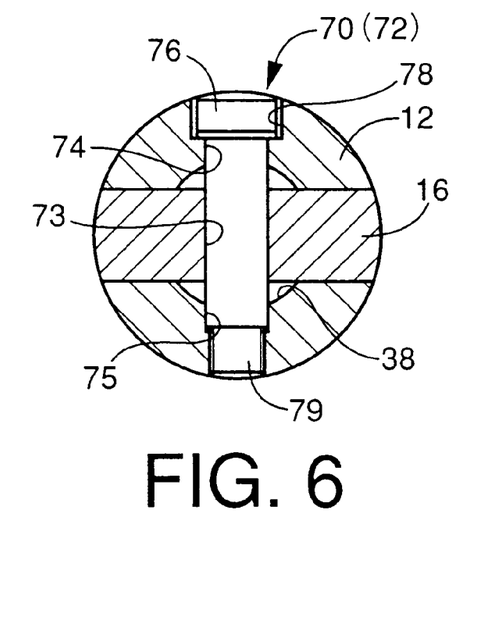
FIG. 6 is a cross sectional view taken along line 6—6 of FIG. 5.
Figure 7:
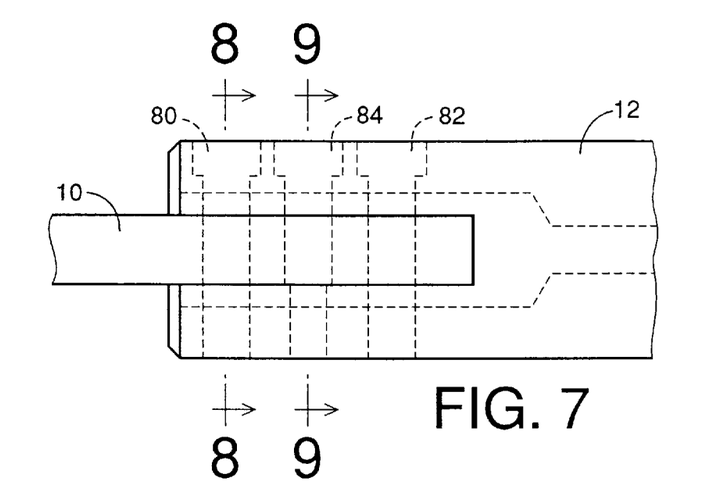
FIG. 7 is a side elevational view showing a proximal end portion of a cutter member and a distal end portion of a shank of a drill according to a further embodiment of the invention.

A drill shown in FIGS. 5 and 6 is constructed according to a second embodiment of this invention. In this drill, the cutter member 10 is removably fixed at its proximal end portion 16 to the shank 12, by two screws 70, 72 which are disposed so as to extend in the diametrical direction of the drill and are spaced apart from each other in the axial direction of the drill. Each of these screws 70, 72 does not have threads in an intermediate portion corresponding to the width w of the cutter member 10, and two portions adjacent the intermediate portion. As shown in FIG. 6, the proximal end portion 16 of the cutter member 10 has two holes 73, while the distal end portion of the shank 12 has two sets of holes 74, 75. The screws 70, 72 whose diameters are accurately controlled are inserted through those holes 73, 74, 75. Each screw 70, 72 has a head 76 at one end thereof, and an externally threaded portion 79 at the other end, while the shank 12 has two counterbores 78, and two internally threaded holes adjacent to the holes 75. With the screws 70, 72 inserted through the holes 73, 74, 75, the heads 76 are accommodated in the counterbores 78, while the externally threaded portions 79 are screwed in the internally threaded holes of the shank 12. Thus, the proximal end portion 16 of the cutter member 10 is firmly fixed to the shank 12 such that the proximal end portion 16 is sandwiched by and between two sections of the shank 12 on the opposite sides of the slot 32. This arrangement is effective to prevent relative movements of the cutter member 10 and the shank 12 in both the axial direction and the radial direction of the drill. The screws 70, 72 are so-called "reamer screws or bolts" which have a function of fixing the cutter member 10 and the shank 12 to each other, and a function of positioning these member 10, 12 relative to each other. With the screws 70, 72 removed, the used cutter member 10 can be removed from the shank 12, and a new cutter member can be removably fixed to the same shank 12.

Figure 8:
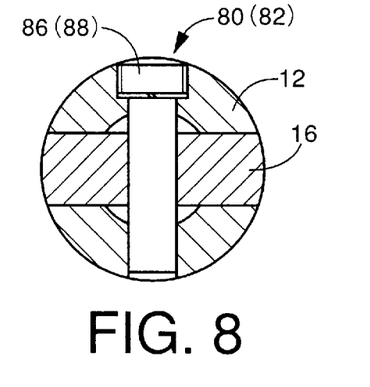
FIG. 8 is a cross sectional view taken along line 8—8 of FIG. 7.
Figure 9:
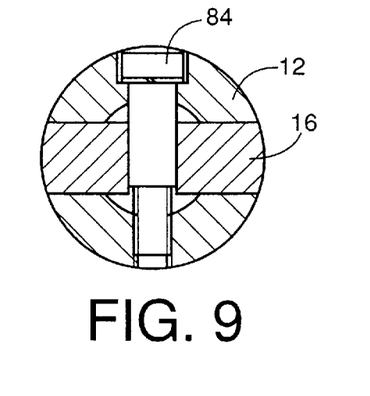
FIG. 9 is a cross sectional view taken along line 9—9 of FIG. 7.

A drill shown in FIGS. 8 and 9 is constructed according to a third embodiment of this invention. In this drill, the cutter member 10 is removably fixed to the shank 12 through two pins 80, 82 and a screw 84 interposed between the pins 80, 82. The two pins 80, 82 are disposed so as to extend in the diametrical direction of the drill and are spaced apart from each other in the axial direction of the drill. The pins 80, 82 have respective externally threaded portions 86, 88, which engage respective internally threaded holes formed in the shank 12, to prevent the removal of the pins 80, 82. The pins 80, 82 prevent relative movements of the cutter member 10 and the shank 12 in the axial and radial directions of the drill, while the screw 84 functions to firmly fix the proximal end portion 16 of the cutter member 10 to the two sections of the shank 12 on the opposite sides of the slot 32. With the pins 80, 82 and screw 84 removed, the used cutter member 10 may be removed from the shank 12 and replaced with a new one.

While the presently preferred embodiments of the present invention have been described above in detail by reference to the accompanying drawings, for illustrative purpose only, it is to be understood that the present invention is not limited to the details of the illustrated embodiments, but may be otherwise embodied.

For instance, the configurations of the cutter member 10 and the shank 12 are not limited to those in the illustrated embodiments.

It is to be understood that the invention may made with various other changes, modifications and improvements, which may occur to those skilled in the art, without departing from the spirit and scope of the invention defined in the appended claims.

What is claimed is:

1. A drill including a cutter member and a shank which are formed separately from each other and fixed to each other for rotation as a unit, wherein an improvement comprises:
   said shank having an engaging groove formed in a distal end face thereof such that said engaging groove extends in an axial direction of said shank and is aligned with a center of said distal end face; and
   said cutter member comprising a rectangular plate including a proximal end portion fixed to said shank by engagement thereof with said engaging groove, and a distal end portion which is remote from said shank and which has at least one cutting edge, said rectangular plate having a width not larger than a diameter of said shank.

2. A drill according to claim 1, wherein said cutter member and said shank are made of different materials.

3. A drill according to claim 1, wherein said shank has a cylindrical distal end portion which has said distal end face, said engaging groove consisting of a slot which is formed through said cylindrical distal end portion in a diametric direction of said cylindrical distal end portion.

4. A drill according to claim 1, wherein said proximal end portion of said cutter member is brazed to said shank.

5. A drill according to claim 4, wherein surface which define said engaging groove include a non-contact portion which is not in contact with said proximal end portion of said cutter member.

6. A drill according to claim 5, wherein said non-contact portion is provided by an axial hole which is formed in said cylindrical distal end portion, so as to extend in said axial direction of said shank, said axial hole having a diameter larger than a width of said engaging groove as measured in a direction perpendicular to a width direction of said rectangular plate.

7. A drill according to claim 1, wherein said proximal end portion of said cutter member is removably fixed to said shank.

8. A drill according to claim 1, wherein said shank has a coolant hole formed therethrough in said axial direction, said coolant hole having a distal end portion which is open in said distal end face and whose axial length is larger than a depth of said engaging groove in said axial direction of said shank, said distal end portion having a diameter larger than a width of said engaging groove.

9. A drill according to claim 8, wherein said shank has a cylindrical distal end portion which has said distal end face, and a ratio of the diameter of said distal end portion of said coolant hole to a diameter of said distal end portion of said shank is within a range of 0.2–0.6.

10. A drill according to claim 1, wherein said plate of said cutter member has an axial length which is at least two times said width.

11. A drill according to claim 1, wherein said proximal end portion includes an engaging part having an axial length equal to an axial depth of said engaging groove so as to be fitted in said engaging groove, a ratio of said axial length of said engaging part to a total axial length of said cutter member is within a range of 0.1–0.5.

12. A drill according to claim 1, wherein said shank has a substantially circular shape in transverse cross section throughout an entire length of said shank, without an axially extending flute on an outer circumferential surface of said shank.

13. A method of manufacturing the drill recited in claim 1 comprising:
   a cylindrical grinding step of grinding said cutter member and said shank which have been fixed to each other, such that end faces of said cutter member which are opposed to each other in a direction of said width and an outer circumferential surface of said shank are simultaneously ground, while said cutter member and said shank are rotated as a unit about an axis thereof.

14. A drill including a cutter member and a shank which are formed separately from each other and fixed to each other for rotation as a unit, wherein an improvement comprises:
   said shank having an engaging groove formed in a distal end face thereof such that said engaging groove extends in an axial direction of said shank and is aligned with a center of said distal end face; and
   said cutter member comprising an elongated plate including a proximal end portion fixed to said shank by engagement thereof with said engaging groove, and a distal end portion which is remote from said shank and which has at least one cutting edge, said elongated plate having a first width which is not larger than a diameter of said shank, and a total axial length which is two to seven times said first width, said distal end portion of said cutter member being provided with thinnings so as to reduce a chisel edge at a line of intersection between two flanks which are formed at a tip of said distal end portion.

15. A drill according to claim 14, wherein said total axial length of said plate is three to seven times said first width.

16. A drill according to claim 14, wherein said distal end portion has a first axial length, while said proximal end portion includes an engaging part which is fitted in said engaging groove and which has a second axial length, and an exposed part which has a third axial length and which is located closer to said distal end portion of said cutter member than said engaging part, a sum of said first, second and third axial lengths being equal to said total axial length, said second axial length being equal to an axial depth of said engaging groove so that said engaging part is fitted in said engaging groove, and a sum of said first and third axial lengths being larger than said width of said elongated plate.

17. A drill according to claim 16, wherein said sum of said first and third axial lengths is at least two times said width of said elongated plate.

18. A drill according to claim 16, wherein said sum of said first and third axial lengths is at least three times said width of said elongated plate.

19. A drill according to claim 14, wherein said two flanks are inclined so as to approach said shank as said two flanks extend radially outward from an axis of said drill, and intersect respective end faces of said distal end portion which are opposed to each other in a direction of said width.

20. A drill according to claim 14, wherein said shank has a coolant hole formed therethrough in said axial direction, said coolant hole having a distal end portion which is open in said distal end face and whose axial length if larger than a depth of said engaging groove in said axial direction of said shank, said distal end having a diameter larger than a width of said engaging groove.

21. A drill according to claim 14, wherein said shank has a substantially circular shape in transverse cross section throughout an entire length of said shank, without an axially extending flute on an outer circumferential surface of said shank.

22. A drill according to claim 16, wherein said proximal end portion has a width which is equal to said first width and which is constant in said axial direction, while said distal end portion includes a part having a second width which is smaller than said first width and which is constant in said axial direction, said proximal end portion and said distal end portion being connected by shoulder portions each including a chamfering edge which serves to chamfer a peripheral edge of a hole formed in a workpiece by penetration of said distal end portion into said workpiece.

23. A method of drilling a hole in a workpiece by a drill including a cutter member and a shank which are formed separately from each other and fixed to each other for rotation as a unit, wherein said cutter member comprises an elongated plate including a proximal end portion fixed to said shank by engagement thereof with an engaging groove formed in an axial direction of said shank, and a distal end portion which is remote from said shank and which has at least one cutting edge, wherein said proximal end portion has a first width which is constant in said axial direction, while said distal end portion includes a part having a second width which is substantially equal to a diameter of a hole to be drilled in a workpiece but smaller than said first width and which is constant in said axial direction, and wherein said proximal end portion includes an engaging part and an exposed part which is located closer to said distal end portion, said engaging part having an axial length equal to an axial depth of said engaging groove so as to be fitted in said engaging groove, said exposed part having a predetermined axial length so that shoulder portions which connect said distal end portion and said proximal end portion are axially distant from said distal end face of said shank by a distance equal to said predetermined axial length, said method comprising:

a step of drilling the hole in the workpiece by penetration of said distal end portion into said workpiece, without said exposed part being penetrated into said workpiece.

* * * * *